United States Patent [19]

Masucci

[11] Patent Number: 4,712,892
[45] Date of Patent: Dec. 15, 1987

[54] REAR SEAT MIRROR

[76] Inventor: Ann M. Masucci, 905 Lichtenthal Ave., Delran, N.J. 08075

[21] Appl. No.: 917,525

[22] Filed: Oct. 10, 1986

[51] Int. Cl.$^4$ .............................. G02B 7/18; B60R 1/00
[52] U.S. Cl. ................................... 350/631; 297/217; 248/466; D6/310
[58] Field of Search .............. 350/631, 600, 97, 107; 248/469–473, 475.1, 466; 297/217, 188; D6/310, 313, 300

[56] References Cited

U.S. PATENT DOCUMENTS

| | | | |
|---|---|---|---|
| 2,109,011 | 2/1938 | Joyce | 248/478 |
| 2,752,822 | 7/1956 | Heeres | 350/631 |
| 3,564,984 | 2/1971 | Alexander | 350/97 |

Primary Examiner—Jon W. Henry
Attorney, Agent, or Firm—Norman E. Lehrer

[57] ABSTRACT

A non-glass rectangular planar mirror is mounted near the top of the seat back of the back seat of an automobile and faces forwardly. The mirror is supported on a generally vertically extending support member which has a horizontal rear foot. This foot fits into the space between the bottom of the seat back and the top of the seat cushion to hold the mirror and support it in place. A rearwardly facing infant seat is secured to the rear seat directly in front of the mirror. The front of the infant seat pushes against the support member to prevent movement thereof. A driver looking through the automobile's rearview mirror or looking over his or her shoulder can observe the child in the infant seat.

6 Claims, 4 Drawing Figures

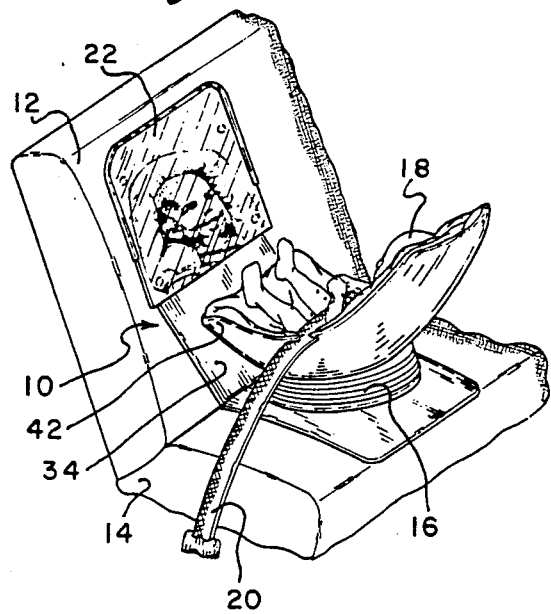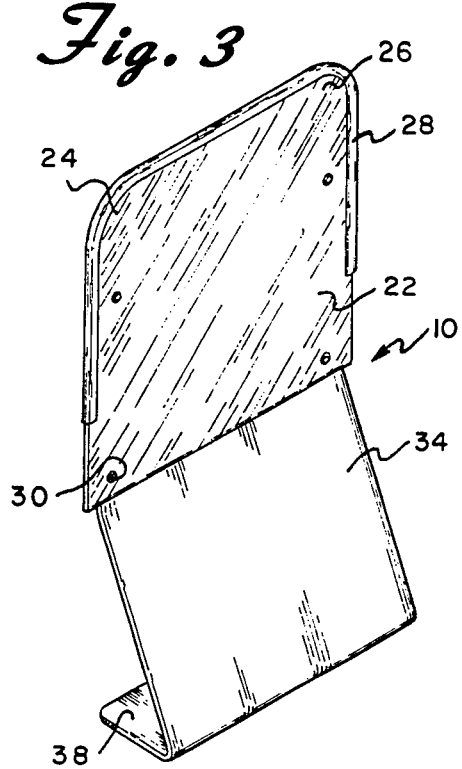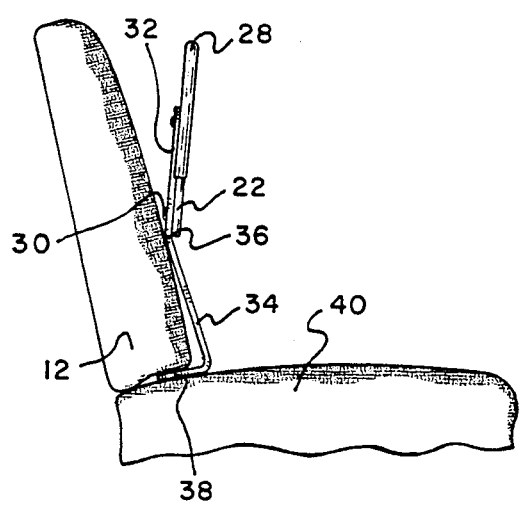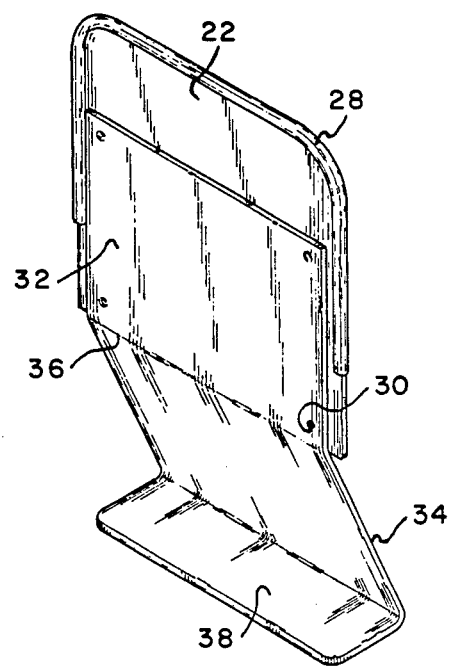

REAR SEAT MIRROR

BACKGROUND OF THE INVENTION

The present invention is directed toward a rear seat mirror for an automobile and more particularly toward such a mirror which can be used by a driver to observe a child sitting in a rearwardly facing infant seat.

Car seats have been utilized for many years for the protection of small children riding in an automobile. In many states, such car seats have become mandatory. These children's seats are normally maintained in place in the vehicle by the use of the vehicle's seat belt and/or shoulder harness.

It is well known that the rear seat of a vehicle is substantially safer for a child sitting in a child or infant seat than is the front seat of the car. Furthermore, the safest arrangement for an infant is for the infant to be seated in an inclined position in the infant seat facing rearwardly in the car and infant seats have been designed to be mounted in the car in this manner.

Utilizing a rearwardly facing infant seat in the rear seat of an automobile has, however, caused some problems. Most significantly is the fact that the driver cannot see the infant seated in the infant seat. When the driver looks over his or her shoulder, all that can be seen is the back of the infant seat and since the better infant seats also include at least partial sides thereon, no part of the infant can be observed. Thus, if an infant begins to cry, the driver cannot observe the infant to see if there is a problem without bending over the back of the front seat which can obviously cause a dangerous situation while the car is being driven. Similarly, if the infant is totally quiet, the driver cannot observe whether the infant is sleeping or is merely being quiet without stopping the car.

It has previously been known to utilize mirrors in the rear of a vehicle such as shown in U.S. Pat. Nos. 1,584,938 and 1,877,997. However, the purpose for the mirrors shown in these patents is to allow the driver to observe the exterior rear of the car for aiding him in parking the same.

Prior U.S. Pat. No. 4,359,266 shows a mirror attachment for a collapsible stroller which allows the infant in the stroller to observe the person pushing the same and vice versa. Furthermore, prior U.S. Pat. Nos. 3,463,440 and 3,905,642 show the use of mirrors in combination with a seat back. However, none of these patents suggests the use of a mirror in combination with an infant seat located in the rear seat of a vehicle so that the driver can observe the infant.

SUMMARY OF THE INVENTION

The present invention provides a solution to the problem described above. A non-glass rectangular planar mirror is mounted near the top of the seat back of the back seat of an automobile and faces forwardly. The mirror is supported on a generally vertically extending support member which has a horizontal rear foot. This foot fits into the space between the bottom of the seat back and the top of the seat cushion to hold the mirror and support it in place. A rearwardly facing infant seat is secured to the rear seat directly in front of the mirror. The front of the infant seat pushes against the support member to prevent movement thereof. A driver looking through the automobile's rearview mirror or looking over his or her shoulder can observe the child in the infant seat.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a front perspective view of the rear seat mirror constructed in accordance with the principles of the present invention and being shown in use in an automobile;

FIG. 2 is a side elevational view of the mirror shown in FIG. 1;

FIG. 3 is a front perspective view of the rear seat mirror standing alone, and

FIG. 4 is a rear perspective view of FIG. 3.

DETAILED DESCRIPTION OF THE PREFERRED EMBODIMENT

Referring now to the drawings in detail wherein like refernce numerals have been used throughout the various figures to designate like elements, there is shown in FIG. 1 a rear seat mirror constructed in accordance with the principles of the present invention and designated generally as 10. The rear seat mirror 10 is shown in use against the seat back 12 of a rear seat 14 in an automobile or similar vehicle. Also shown is an infant seat 16 having a child 18 sitting therein and facing rearwardly. The infant seat 16 is of a conventional type well known in the art and, accordingly, will not be described in detail. The seat 16 is held in place in the known manner through the use of the vehicle's seat belt 20.

As shown most clearly in FIG. 3, the rear seat mirror 10 is comprised of a substantially rectangularly shaped planar mirror 22 which is preferably composed of a non-glass and non-breakable material such as a Mylar plastic or the like. Such mirror-like materials are well known and are readily available. Obviously, a glass mirror would not be desirable since, in the case of an accident, the glass might shatter and injure the child in the infant seat.

Although the mirror 22 is substantially rectangular, the upper corners 24 and 26 thereof are rounded. The rounding of these corners eliminates any exposed sharp edges which also is intended to prevent injury in the event of an accident. Further protection is provided by covering at least a portion of the outer edge of the mirror 22 with a protective molding 28. Although the mirror 22 is substantially rectangular in shape in the preferred embodiment of the invention, it should be readily apparent to those skilled in the art that various other shapes might also be possible.

Through the use of four rivets or similar securing means such as shown at 30, the mirror 22 is attached to the upper end 32 of a sheet-like plastic support member 34. The support member 34 is substantially the same width as the mirror 22 and extends generally vertically. Preferably, the support member 34 is provided with a slight bend 36 adjacent a midpoint thereof so that the upper portion 32 and mirror 22 attached thereto face slightly downwardly as shown most clearly in FIG. 2.

The lowermost end of the support member 34 includes a foot 38 which extends generally horizontally and rearwardly of the device 10. As shown in FIG. 2, the foot 38 is adapted to fit into the space between the bottom of the seat back 12 and the top of the seat cushion 40.

The rear seat mirror is utilized in the following manner in order to provide a forward viewing arrangement for an automobile. The device 10 is installed onto the back seat of the automobile by inserting the foot 38 into the space between the substantially horizontal top of the seat cushion 40 and the bottom of the substantially vertically extending seat back 12 as shown in FIG. 2. Depending, of course, on the specific configuration of the back seat, the back of the mirror 22 will lie substantially against the seat back 12 although it will preferably tilt slightly downwardly as shown in FIG. 2.

With the rear seat mirror 10 in the position shown in FIG. 2 with the mirror 22 facing forwardly, the infant seat 16 is then placed into its normal position with the bottom thereof resting on the top of the seat cushion 40. The forward end 42 will press against the support member 34 to force it against the seat back 12 thereby preventing forward movement of the rear seat mirror 10. The infant seat 16 and thus the device 10 are then secured firmly in place through the use of the car's seat belt 20.

With the arrangement shown in FIG. 2 of the rear seat mirror 10 and the infant seat 16, a driver looking over his or her shoulder toward the back seat of the car need only look into the mirror 22 to see the child sitting in the infant seat 16. Obviously, the child can also then look at the driver and can also see various other things around him through the mirror 22. Alternatively, it may be possible for the driver to adjust the automobile's rearview mirror so that the child can be viewed through the rearview mirror and through the mirror 22.

The present invention may be embodied in other specific forms without departing from the spirit or essential attributes thereof and accordingly reference should be made to the appended claims rather than to the foregoing specification as indicating the scope of the invention .

I claim:

1. A forward viewing arrangement for an automobile comprising:
   an automobile back seat including a generally horizontal seat cushion and a generally vertically extending seat back;
   a non-glass mirror, and
   means for mounting said mirror to said automobile such that said mirror lies substantially against said seat back adjacent the top thereof and wherein said mirror faces the front of said automobile.

2. The invention as claimed in claim 1 wherein said mirror is mounted on a generally vertically extending support member.

3. The invention as claimed in claim 2 wherein said support member includes a generally horizontal and rearwardly extending foot adjacent the bottom thereof, said foot being adapted to fit between the bottom of said seat back and the top of said seat cushion.

4. The invention as claimed in claim 1 wherein said mirror is comprised of a plastic material.

5. The invention as claimed in claim 1 wherein said mirror is substantially rectangular.

6. The invention as claimed in claim 1 further including protective molding means around at least a portion of the outer edges of said mirror.

* * * * *